United States Patent [19]

Bhattacharya

[11] Patent Number: 5,550,104
[45] Date of Patent: Aug. 27, 1996

[54] ELECTRODEPOSITION PROCESS FOR FORMING SUPERCONDUCTING CERAMICS

[75] Inventor: Raghu N. Bhattacharya, Littleton, Colo.

[73] Assignee: Davis, Joseph & Negley, Golden, Colo.

[21] Appl. No.: 303,437

[22] Filed: Sep. 9, 1994

[51] Int. Cl.$^6$ .................. C25D 5/18; H01L 39/24
[52] U.S. Cl. .................. 505/472; 205/51; 205/103; 205/104; 505/510
[58] Field of Search .................. 205/51, 102, 103, 205/104; 505/510, 725, 739, 778, 472

[56] References Cited

U.S. PATENT DOCUMENTS

| | | | |
|---|---|---|---|
| 2,651,609 | 9/1953 | Chester | 205/102 |
| 2,824,830 | 2/1958 | Hausner | 205/103 X |
| 3,959,088 | 5/1976 | Sullivan | 205/104 |
| 4,840,711 | 6/1989 | Joseph | 205/104 |
| 4,870,051 | 9/1989 | Maxfield et al. | 505/472 |
| 4,879,270 | 11/1989 | Maxfield et al. | 505/410 |
| 4,939,308 | 7/1990 | Maxfield et al. | 505/434 |
| 5,120,707 | 6/1992 | Maxfield et al. | 505/325 |
| 5,162,295 | 11/1992 | Behi et al. | 505/472 |
| 5,413,987 | 5/1995 | Bhattacharya et al. | 505/492 |

OTHER PUBLICATIONS

Bhattacharya et al, YBaCuO and TlBaCaCuO Superconductor Thin Films Via An Electrodeposition Process, *Journal of the Electrochemical Society*, vol. 139, No. 1, Jan. 1992, pp. 67–69.

DeLuca et al, The Preparation of "1223"Tl–Ca–Ba–Cu–oxide Superconducting Films . . . ,*Physica C* 205 (1993), pp. 21–31.

*Primary Examiner*—John Niebling
*Assistant Examiner*—William T. Leader
*Attorney, Agent, or Firm*—Poms, Smith, Lande & Rose

[57] ABSTRACT

A method for making superconducting ceramic precursor films by electrodeposition. In the electrodeposition step, superconducting precursor metal ions are electrodeposited onto a working electrode by applying a combined direct current voltage upon which is superimposed an alternating current having a frequency of between about 5 to 100 KHz. The resulting electrodeposited film is particularly well suited for further oxidation/annealing to form a superconducting ceramic.

18 Claims, 4 Drawing Sheets

5,550,104

ELECTRODEPOSITION PROCESS FOR FORMING SUPERCONDUCTING CERAMICS

The United States Government has certain rights in this invention pursuant to NREL Contract No. 1287.

BACKGROUND OF THE INVENTION

1. Field of the Invention

The present invention relates generally to superconducting ceramics and processes for forming thin films of superconducting ceramics. More particularly, the present invention is directed to a electrodeposition process where an alternating current is utilized in conjunction with a direct electrical current to deposit superconducting ceramics onto a wide variety of substrates.

2. Description of Related Art

There has been a great deal of effort expended in designing and developing suitable processes for making superconducting ceramics. The most desirable of these processes are those which are simple, efficient and are capable of producing a ceramic superconductor with a relatively high superconducting transition temperature ($T_c$). Processes which employ deposition as part of the superconductor fabrication procedure have been proposed due to the simplicity, reproducability and coating quality which can be obtained using electrodeposition techniques.

The deposition processes used to form superconducting ceramics typically involve electroplating a mixture of the desired metals onto a suitable surface to form a film of superconducting precursor metals which is then annealed at high temperature to form the superconducting oxide. (Exemplary electrodeposition procedures are set forth in the following U.S. Pat. Nos.: 4,870,051; 4,879,270; 4,939,308; 5,120,707; and 5,162,295.)

Although many of the deposition procedures which have been developed are well suited for their intended purpose, there still is a continuing need to develop further deposition procedures that are simple, efficient and are capable of producing superconducting ceramics which have relatively high superconducting transition temperatures.

SUMMARY OF THE INVENTION

In accordance with the present invention, a deposition process which is based upon electrodeposition is provided for producing superconducting ceramics. The process is simple, efficient and is capable of producing superconducting ceramics having relatively high superconducting transition temperatures.

The method of the present invention involves providing a working electrode which has a surface upon which superconducting precursor metals are deposited. The working electrode, along with a counter-electrode, is emersed in a solution which comprises a mixture of superconducting precursor metal ions. The metal ions are electrodeposited onto the surface of the working electrode to form a film thereon which includes a mixture of the superconducting precursor metals in the proportions which are required for formation of a superconducting ceramic.

As a feature of the present invention, electrodeposition of the superconducting precursor metal ions onto the working electrode surface is accomplished by applying a direct current voltage between the working electrode and the counterelectrode and, in addition, an alternating current is simultaneously applied between the working electrode and counterelectrode. The combination of applying a direct current voltage in combination with an alternating current was found to produce a film of superconducting precursor metals which is particularly well suited for further fabrication into superconducting ceramics.

The film of superconducting precursor metals which is deposited in accordance with the present invention is then oxidized by annealing at high temperature to produce a wide variety of superconducting ceramics. The present invention is particularly well-suited for producing superconducting ceramics such as TlBaCaCuO, YBaCuO and BiSrCaCuO. This method may also be used in producing any of the other known superconductor oxides.

As a feature of the present invention, the superconducting ceramic maybe doped with silver by including silver ion in the electrolyte. Further, metals such as thallium can be electrodeposited during the initial deposition of metal precursors. Alternatively, the thallium or other metal may be incorporated into the film from a vapor source during the oxidation/annealing step.

The improved electrodeposition method of the present invention provides a process which has considerable practical potential, particularly in the fabrication of large nonplanar devices. The improved deposition method is a low-cost process which has the ability to deposit films of ceramic superconductors on substrates of any shape, including wires and tapes. The annealing time required to oxidize the deposited precursors in accordance with the present invention is decreased because mixing of the deposited metal ions occurs at an atomic level. This results in the production of submicron sized particles which are produced in the deposited film and are especially well suited for oxidation to form superconducting ceramics.

The above discussed and many other features and attendant advantages of the present invention will become apparent as the invention becomes better understood by reference to the following detailed description when taken in conjunction with the accompanying drawings.

DETAILED DESCRIPTION OF THE INVENTION

Figure 1:
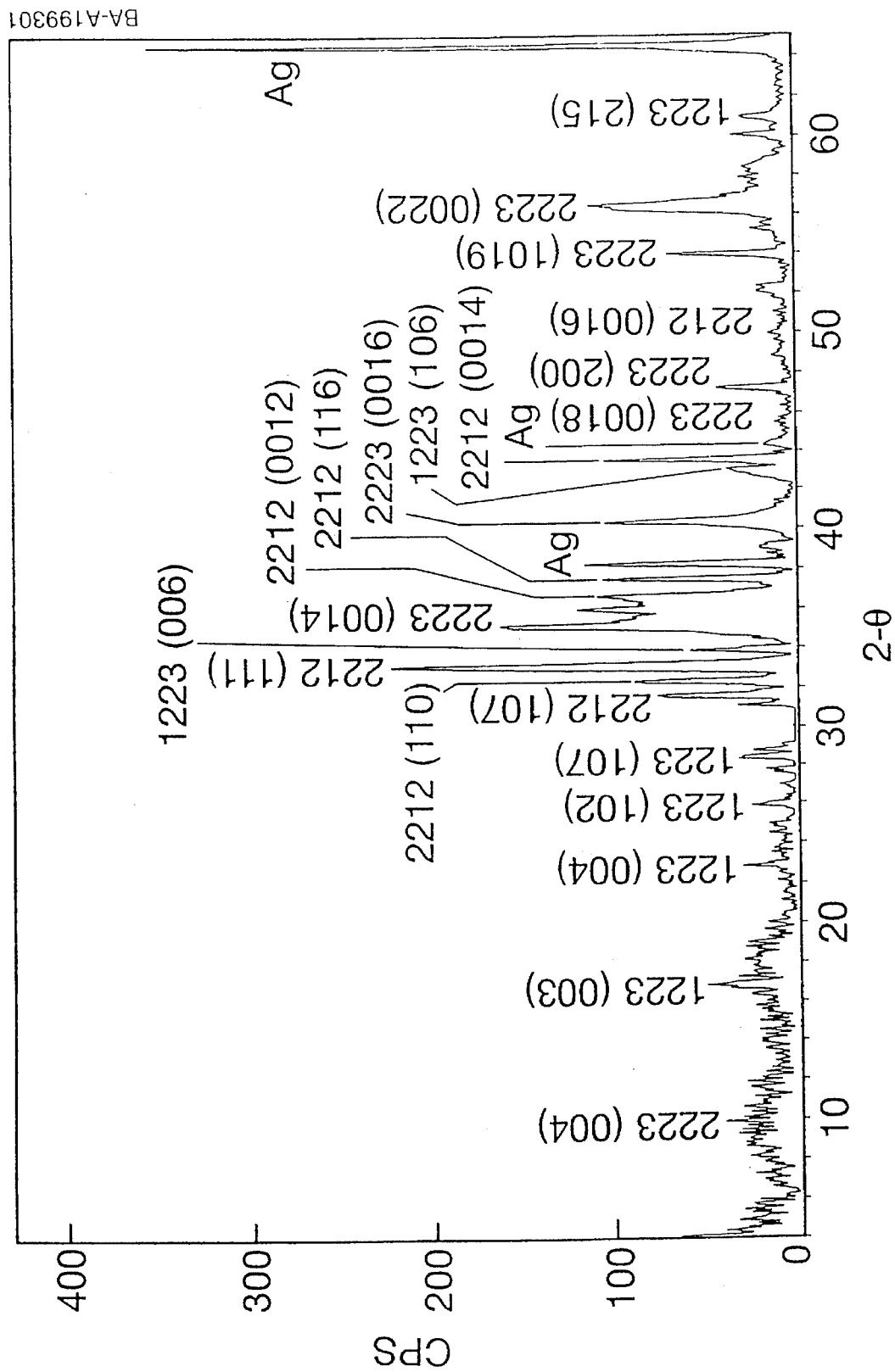
FIG. 1 sets forth an X-ray diffraction scan of a superconducting film prepared in accordance with the present invention on a silver substrate.

The process of the present invention first involves electrodeposition of superconducting precursor metal ions onto a desired substrate surface to form a film of superconducting precursor metals in proportions which are sufficient to be oxidized into a superconducting ceramic. After electrodeposition, the deposited film is then oxidized/annealed at high temperature to form the final superconducting ceramic.

The electrodeposition is accomplished by applying fixed direct current voltage onto which is applied an alternating current. As will be described in detail below, the application of an alternating current frequency between the electrodeposition deposition electrodes is an important aspect of the present invention which enhances the overall fabrication process and resulting superconducting ceramic.

In the present invention, a working electrode is provided onto which the superconducting precursor metals are to be deposited. One or more counterelectrodes are utilized. Preferably, the working electrode will be silver or other suitable material providing a desirable substrate for the final superconducting film. The shape of the electrode can be in virtually any form, including wires, tapes and any other desired shape onto which the superconducting film is to be fabricated. The counterelectrodes are preferably made from platinum or other inert material.

The electrolyte bath can be any of the known electrolyte baths which have been used to deposit superconducting metal ions onto working electrodes. The metal ions will include La, Y, Sm, Eu, Gd, Tb, Dy, Ho, Er, Pb, Hg, Ag, Tm Yb, Lu, Th, Ba, Bi, Tl, Sr, Ca and Cu. The particular concentrations of the metal precursor ions are selected depending upon the desired superconducting ceramic. The particular metal ions and their concentrations within the electrolyte are either well known or may be determined with a small amount of routine experimentation. The relative concentrations of the superconducting precursor metal ions are chosen in proportions which are sufficient to insure that subsequent oxidation of the deposited film results in the formation of a superconducting ceramic. The superconducting precursor metal ions are preferably added to the electrolyte as salts. Nitrate salts are preferred, however, other conventional metal salts have been used and are suitable. The preferred electrolyte is dimethyl sulfoxide (DMSO). Other conventional electrolytes may be utilized, including mixture of water and DMSO, dimethyl formamide (DMF), mixture of water and DMF. The amount of water in the mixtures with DMSO and DMF can range from 1 volume percent to 50 volume percent. When a mixture of water and DMSO or DMF is used, it is preferred that the amount of water in the mixture be on the order of 10 to 20 volume percent.

Once the solution of electrolyte and desired metal ions has been prepared, the working electrode and counterelectrodes are emersed into the solution. As an important aspect of the present invention, a direct current having a voltage of between 2 to 10 volts is applied between the working electrode and the counterelectrode. Voltages on the order of 4 to 6 volts are preferred. In addition to applying a direct current voltage, an alternating current is applied between the working and counterelectrodes. The frequency of the alternating current is between about 5 KHz to 1 00 KHz. Frequencies on the order of 15 to 20 KHz are preferred. Power supplies which are capable of providing constant voltage output while simultaneously applying an alternating current are commercially available. It is preferred that the voltage setting of the power supply is not affected when varying the current frequency and, equally important, the frequency should not be affected when varying the voltage. Preferably, the current pulse train AC signal is a square wave train with on/off intervals increasing or decreasing with varying frequency. A preferred exemplary power source is available from Team Specialty Products Corporation (Albuquerque, N.M.). This power source is capable of providing a constant 6 amp output between a counterelectrode and working electrode with the alternating current variable between 0 and 18.2 KHz. The alternating current is independent of the voltage output which is variable from 0 to 20 volts. The power supply is stable and not easily affected by power line fluctuations. The power supply voltage setting is not affected when varying the current frequency and the frequency is not affected when varying the voltage. The current pulse train for this power supply is a square wave train with on/off intervals increasing or decreasing with varying frequency (on command).

The particular voltage and alternating current frequency which is applied between the counter and working electrodes will vary depending upon the particular metal ions being deposited and the final superconducting ceramic desired. It is a matter of routine experimentation to vary both voltage and frequency within the ranges set forth above to establish applied voltages and frequencies which optimize electrodeposition deposition and superconductor ceramic production.

Typically, the electrodeposition is conducted at room temperature. However, if desired, the temperature can be raised to as high as 100° C. Other electrodeposition parameters are conventional and well known to those skilled in the art. The time required to electrodeposition deposit films of desired thicknesses will vary depending upon a number of different parameters. The amount of time required for depositing a particular thickness of material is easily established by routine experimentation. If desired, a relatively thick film may be deposited and then scraped from the surface to form precursor powder.

Once the film is deposited as set forth above, the next step in the method of the present invention involves oxidation of the film of superconducting precursor metals to form the superconducting ceramic. This oxidation/annealing step is conducted in the same manner as the oxidation/annealing step set forth in the previously described group of patents Typically, annealing will take place at temperatures on the order of 600° to 1200° C in an oxygen containing atmosphere. The annealing can take place in air, if desired. In certain situations, it is desirable to introduce one or more of the metals required for superconductor ceramic formation during the annealing process. For example, thallium may be deposited from the vapor phase during the annealing step, instead of during the initial deposition process. Further, the superconducting precursor metal film may be doped with small amounts of silver on the order of between about 0.1 percent and about 4.0 percent by weight. This doping is accomplished by adding a silver salt, such as $AgNO_3$ to the electrolyte.

Examples of practice are as follows:

EXAMPLE 1—Preparation of Ag-doped
Tl-Ba-Ca-Cu-O Superconducting Ceramic Using Vapor
Phase Introduction Of Tl a) Electrodeposition of superconductor precursor metal film A electrodeposition solution of dimethylsulfoxide (DMSO) was prepared having the following salt concentrations of metal ions: 7.59 gm $Ba(NO_3)_2$, 3.64 gm $Ca(NO_3)_2 \cdot 4H_2O$, 2.98 gm $Cu(NO_3)_2 \cdot 6H_2O$ and 0.2 gm $AgNO_3$ in 390 ml of DMSO.

The electrodeposition was performed in a closed-cell configuration at 24° C. The electrolyte solution was purged through a commercial diffuse bubbler with an initial high flow (30 cc/min) of the $N_2$ gas for 30 minutes prior to an actual electrodeposition deposition, thereby removing most of the atmospheric contaminants, followed by a low flow (8.5 cc/min) purge during the electrodeposition deposition process to prevent recontamination. The working electrode was commercial-grade flexible 0.125-mm thick Ag foil (99.9% pure). The applied direct current voltage ranged from 4 to 6 volts and the applied alternating current frequency range was 15 to 18.2 KHz. All samples were deposited in a vertical cell, where the electrodes (working and counter) were suspended vertically from the top of the cell. All chemicals were of Analar or Puratronic-grade purity and were used as received. A conventional two-electrode cell was employed, where the counter electrode was a Pt gauze. Two opposed Pt gauze counter electrodes on either side of the Ag foil working electrode were employed so that a properly stoichiometric film was deposited on both sides of the Ag substrate. A number of film depositions were performed under a controlled atmosphere (i.e. purged with $N_2$ gas) and with minimal stirring, thus assuring the process occurred in the diffusion-limited regime.

b) Annealing of precursor BCCO

The deposited films were processed using a two-zone flowing anneal which employs a separate Tl source zone and a sample zone within which $O_2$ is at an ambient level. The annealing process consisted of inserting the sample and heating to 860° C. while the Tl source was kept initially at a low temperature of 690° C. for 10 minutes and then increased to 725° C. and held for 45 minutes. The sample and the thallium oxide boat were cooled at a rate of 5° C./minute at the end of the process. The X-ray diffraction (2Θ vs intensity) of one of the annealed films is shown in FIG. 1 indicates a mixture of 1223 (TlBa$_2$Ca$_2$Cu$_3$O$_x$), 2223 (Tl$_2$ Ba$_2$Ca$_2$Cu$_{3Ox}$) and 2212 (Tl$_2$Ba$_2$Ca$_1$Cu$_2$O$_x$) phases.

The samples were evaluated for their superconducting properties by resistance versus temperature (R-T) measurements and four-probe transport (critical current) measurements in He vapor. Four Ag contacts were made on one side of the sample by evaporating Ag in vacuum. Ag wires were soldered to the Ag contacts using In solder. The sample was inserted slowly into the precooled chamber of the squid-magnet that is capable of producing maximum fields of 5.5T. The magnetic field was applied perpendicular to the plane of the substrate. X-ray diffraction data were obtained on a Rigaku Rotaflex Model Ru 200 instrument using CuKa radiation. The X-ray peak of Ag that was usually present due to the Ag contacts or the Ag foil and was used as a reference for the X-ray diffraction analysis.

Figure 2:
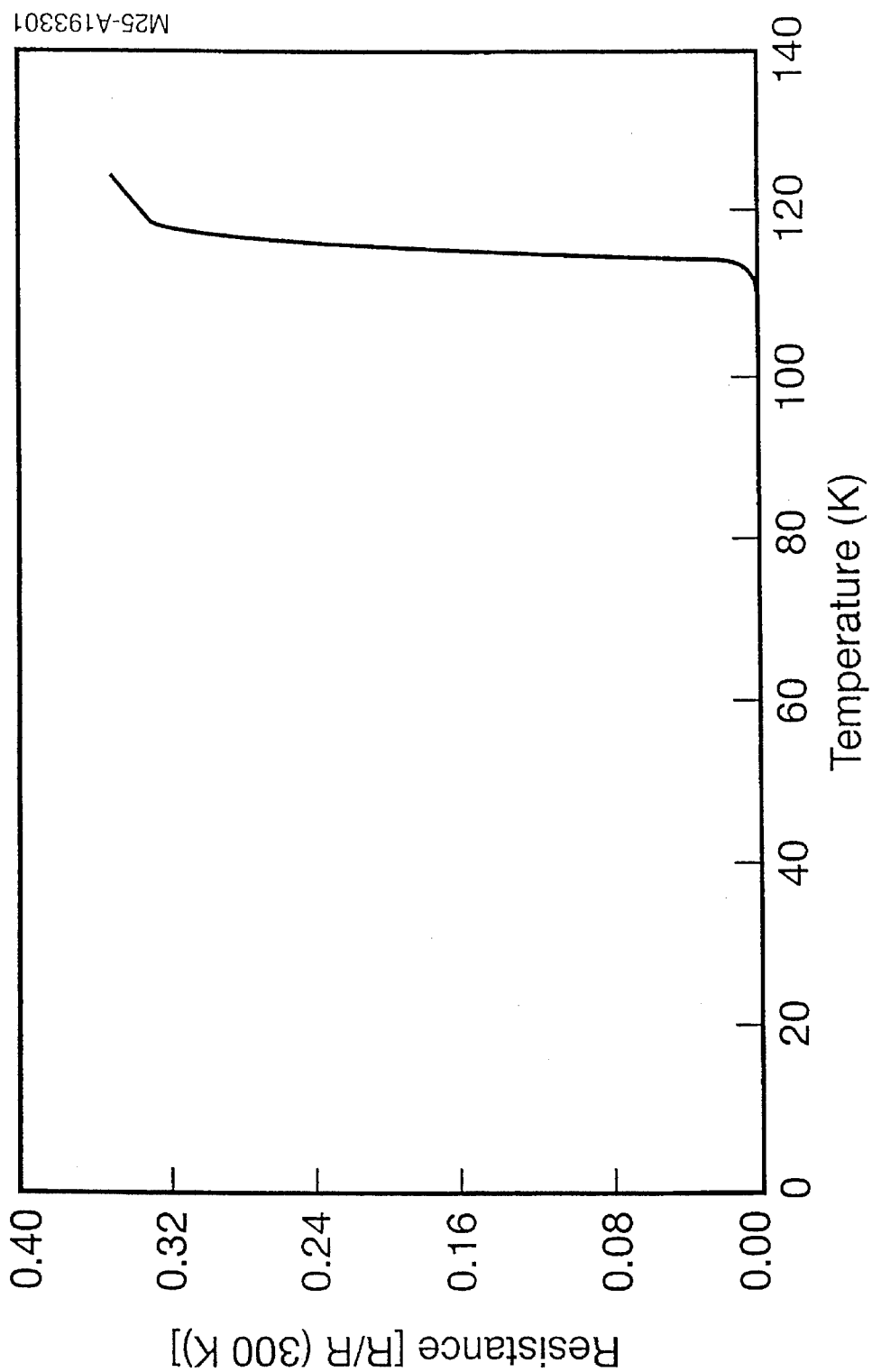
FIG. 2 is a graph showing the resistance versus temperature for a TlBaCaCuO (TBCCO) film prepared in accordance with the present invention.
Figure 3:
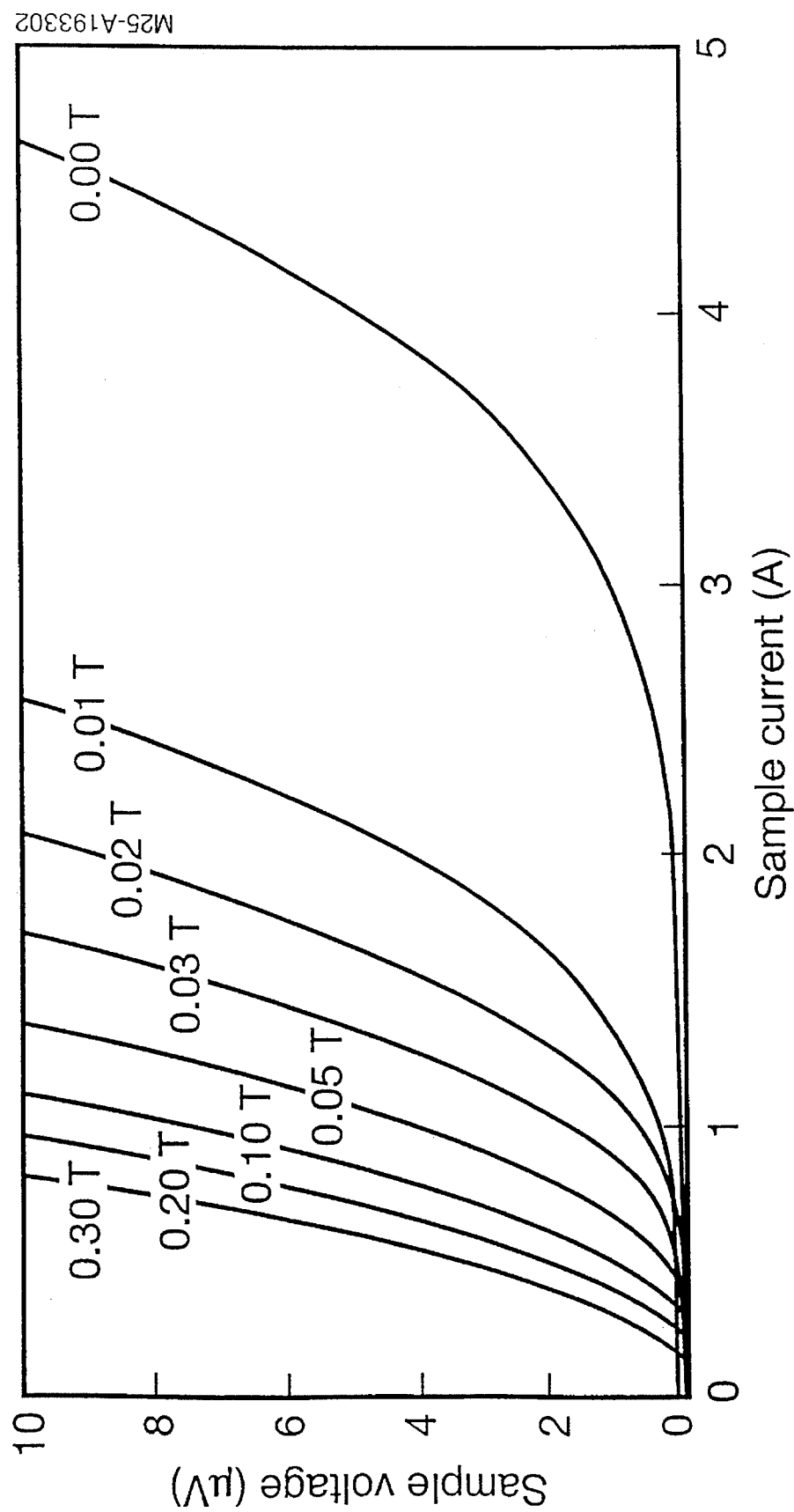
FIG. 3 is a representative I-B curve of a film prepared in accordance with the present invention measured at 77° K in perpendicular magnetic field with values from 0 to 0.3T.
Figure 4:
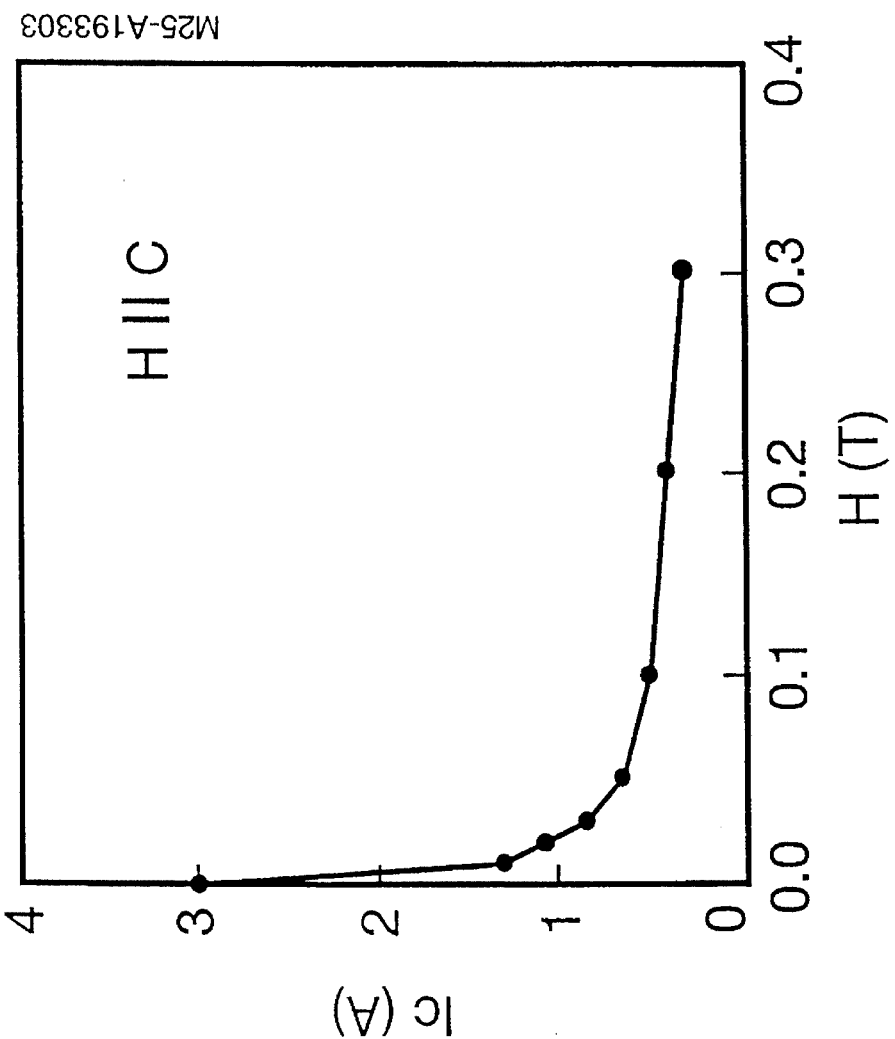
FIG. 4 sets forth the $I_c$ versus $H_t$ data for a film prepared in accordance with the present invention measured at 77° K

The resistive transition for the film (shown in FIG. 2) is fairly sharp with an onset temperature of 118° K. and zero-resistance temperature of 110° K. The transport measurements of the film are shown in FIG. 3 (I vs V), and FIG.4 ($I_c$ vs $H_T$), The transport was measured at 77° K. under a magnetic field up to 0.3T. The field dependence for the Tl-superconductor film was impressive even for the field oriented perpendicular to the ab plane.

EXAMPLE 2—Preparation of Tl-Ba-Ca-Cu-O Precursor Film

The electrodeposition deposition process described in Example 1 is carried out except that Tl is included in the DMSO electrolyte in a concentration of 1 gm Tl $NO_3$. The electrodeposited Tl is annealed with the other deposited metals under favorable ambient conditions for a time and temperature sufficient to form the superconducting ceramic.

EXAMPLE 3—YBaCuO 7.666 gm Y(NO$_3$)$_3$•6H$_2$O, 10.427 gm Ba(NO$_3$)$_2$, and 5.915 gm CU(NO$_3$)$_2$•6H$_2$O is dissolved in 300 ml dimethyl sulfoxide (DMSO) solution. A YBaCuO precursor film is then deposited onto a silver foil electrode in the same manner as Example 1. The precursor film is then annealed under favorable ambient conditions for a time and temperature sufficient to form a superconducting ceramic.

EXAMPLE 4—YBaCuO 7.666 gm Y(N$_{03}$)$_6$•6H$_2$O, 10.427 gm Ba(N0$_3$)$_2$, and 5.915 gm Cu(NO$_3$)$_2$•6H$_2$O is dissolved in 300 ml DMSO solution. To this solution 30 ml water is added. A YBaCuO precursor film is then deposited onto a silver foil electrode in the same manner as Example 1. The precursor film is then annealed under favorable ambient conditions for a time and temperature sufficient to form a superconducting ceramic.

EXAMPLE 5—BaCaCuAgO 7.706 gm Ba(NO3)2, 3.543 gm Ca(NO3)2.4H20, 3.558 gm CU(NO3)2* 6H20, and 0.204 gm AgNO$_3$ is dissolved in 390 ml DMSO solution. A BaCaCuAgO precursor film is then deposited onto a silver foil electrode in the same manner as Example 1. The precursor film is then annealed under favorable ambient conditions for a time and temperature sufficient to form a superconducting ceramic.

EXAMPLE 6—BaCaCUAgO 7.706 gm Ba(NO$_3$)$_2$, 3.543 gm Ca(NO$_3$)$_2$•4H$_2$O, 3.558 gm CU(NO$_3$)$_2$•6H$_2$O, and 0.204 gm AgNO3 is dissolved in 390 ml DMSO solution. To this solution 30 ml water is added. A BaCaCuAgO precursor film is then deposited onto a silver foil electrode in the same manner as Example 1. The precursor film is then annealed under favorable ambient conditions for a time and temperature sufficient to form a superconducting ceramic.

EXAMPLE 7—BaCaCuO 7.706 gm Ba(NO$_3$)$_2$, 3.567 gm Ca(NO$_3$)$_2$•4H$_2$O, and 3.555 gm Cu(NO$_3$)$_2$•6H$_2$O is dissolved in 200 ml DMSO solution. A BaCaCuO precursor film is then deposited onto a silver foil electrode in the same manner as Example 1. The precursor film is then annealed under favorable ambient conditions for a time and temperature sufficient to form a superconducting ceramic.

EXAMPLE 8—BaCaCuO 7.706 gm Ba(NO$_3$)$_2$•3.567 gm Ca(NO$_3$)$_2$•4H$_2$O, 3.555 gm Cu(NO$_3$)$_2$•6H$_2$O is dissolved in 200 ml DMSO solution. To this solution 30 ml water is added. A BaCaCuO precursor film is then deposited onto a silver foil electrode in the same manner as Example 1. The precursor film is then annealed under favorable ambient conditions for a time and temperature sufficient to form a superconducting ceramic.

EXAMPLE 9—BaCaCuBiSrPbO 7.706 gm Ba(NO$_3$)$_2$•3.974 gm Ca(NO$_3$)$_2$•4H$_2$O, 3.552 gm CU(NO$_3$)$_2$•6H$_2$O, 0.882 gm Bi(NO$_3$)$_3$•5H$_2$O, 1.015 gm Sr(NO$_3$)$_2$, and 1.158 gm Pb(NO$_3$)$_2$ is dissolved in 300 ml DMSO solution. A BaCaCuBiSrPbO precursor film is then deposited onto a silver foil electrode in the same manner as Example 1. The precursor film is then annealed under favorable ambient conditions for a time and temperature sufficient to form a superconducting ceramic.

EXAMPLE 10—BaCaCuBiSrPbO 7,705 gm Ba(NO$_3$)$_2$3.974 gm Ca(NO$_3$)$_2$•4H$_2$O, 3,553 gm Cu(NO$_3$)$_2$•6H $_2$O, 0.882 gm Bi(NO$_3$)$_3$•5H$_2$O, 1.015 gm Sr (NO$_3$)$_2$, and 1,158 gm Pb(NO$_3$)$_2$ is dissolved in 300 ml DMSO solution. To this solution 30 ml water is added, A BaCaCuBiSrPbO precursor film is then deposited onto a silver foil electrode in the same manner as Example 1, The precursor film is then annealed under favorable ambient conditions for a time and temperature sufficient to form a superconducting ceramic.

EXAMPLE 11—PbBiSrCaCUO 1.423 gm $Pb(NO_3)_2$, 1.957 gm $Bi(NO_3)_3 \cdot 5H_2O$, 9.870 gm $Sr(NO_3)_2$, 5.037 gm $Ca(NO_3)_2 \cdot 4H_2O$, and 4.054 gm $CU(NO_3)_2 \cdot 6H_2O$, is dissolved in 300 ml DMSO solution. A PbBiSrCaCuO precursor film is then deposited onto a silver foil electrode in the same manner as Example 1. The precursor film is then annealed under favorable ambient conditions for a time and temperature sufficient to form a superconducting ceramic.

EXAMPLE 12—PbBiSrCaCuO 1.423 gm $Pb(NO_3)_2$, 1.957 gm $Bi(NO_3)_3 \cdot 5H_2O$, 9.870 gm $Sr(NO_3)_2$, 5.037 gm $Ca(NO_3)_2 \cdot 4H_2O$, and 4.054 gm $CU(NO_3)_2 \cdot 6H_2O$, is dissolved in 300 ml DMSO solution. To this solution 30 ml water is added. A PbBiSrCaCuO precursor film is then deposited onto a silver foil electrode in the same manner as Example 1. The precursor film is then annealed under favorable ambient conditions for a time and temperature sufficient to form a superconducting ceramic.

EXAMPLE 13—BiSrCaCuO 2.212 gm $Bi(NO_3)_3 \cdot 5H_2O$, 11.608 gm $Sr(NO_3)_2$, 5.595 gm $Ca(NO_3)_2 \cdot 4H_2O$, and 4.094 gm $Cu(NO_3)_2 \cdot 6H_2O$, is dissolved in 300 ml DMSO solution. A PbBiSrCaCuO precursor film is then deposited onto a silver foil electrode in the same manner as Example 1. The precursor film is then annealed under favorable ambient conditions for a time and temperature sufficient to form a superconducting ceramic.

EXAMPLE 14—BiSrCaCuO 2.212 gm $Bi(NO_3)_3 \cdot 5H_2O$, 11.608 gm $Sr(NO_3)_2$, 5.595 gm $Ca(NO_3)_2 \cdot 4H_2O$, and 4.094 gm $Cu(NO_3)_2 \cdot 6H_2O$, is dissolved in 300 ml DMSO solution. To this solution 30 ml water is added. A PbBiSrCaCuO precursor film is then deposited onto a silver foil electrode in the same manner as Example 1. The precursor film is then annealed under favorable ambient conditions for a time and temperature sufficient to form a superconducting ceramic.

EXAMPLE 15—TlBiSrBaCaCuAgO 2.027 gm $TlNO_3$, 2.000 gm $Bi(NO_3)_3 \cdot 5H_2O$, 14.206 gm $Sr(NO_3)_2$, 9.413 gm $Ba(NO_{03})_3$, 6.217 gm $Ca(NO_3)_2 \cdot 4H_2O$, 5.061 gm $Cu(NO_3)_2 \cdot 6H_2O$, and 0.204 gm $AgNO_3$ is dissolved in 300 ml DMSO solution. A PbBiSrCaCuO precursor film is then deposited onto a silver foil electrode in the same manner as Example 1. The precursor film is then annealed under favorable ambient conditions for a time and temperature sufficient to form a superconducting ceramic.

EXAMPLE 16—TlBiSrBaCaCuAgO 2.027 gm $TlNO_3$, 2.000 gm $Bi(NO_3)_3, 5H_2O$, 14.206 gm $Sr(NO_3)_2$, 9.413 gm $Ba(NO_3)_2$, 6.21 7 gm $Ca(NO_3)_2 \cdot 4H_2O$, 5.061 gm $Cu(NO_3)_2 \cdot 6H_2O$ and 0.204 gm $AgNO_3$ is dissolved in 300 ml DMSO solution. To this solution 30 ml water is added. A PbBiSrCaCuO precursor film is then deposited onto a silver foil electrode in the same manner as Example 1. The precursor film is then annealed under favorable ambient conditions for a time and temperature sufficient to form a superconducting ceramic.

Having thus described exemplary embodiments of the present invention, it should be noted by those skilled in the art that the disclosures herein are exemplary only and that various other alternations, adaptations and modifications may be made within the scope of the present invention. Accordingly, the present invention is not limited to the specific embodiments as illustrated herein.

What is claimed is:

1. A method for making a superconducting ceramic precursor film, said method comprising the steps of:

a) providing a working electrode which comprises a surface;

b) providing at least one counter electrode which comprises a surface;

c) immersing said working electrode and counter electrode in a solution which comprises a mixture of superconducting precursor metal ions;

d) electrodepositing said superconducting precursor metal ions onto the surface of said working electrode to form a film thereon comprising a mixture of superconducting precursor metals in proportions sufficient to be oxidized into a superconducting ceramic, wherein said electrodepositing consists of the step of:

simultaneously applying a direct current voltage of between 2 to 10 volts between said working electrode and said counter electrode and a square wave alternating current signal between said working electrode and said counter electrode wherein the frequency of said alternating current signal is between about 5 KHz to 100 KHz wherein said direct current voltage and said alternating current signal are applied together at a combined voltage of up to 20 volts for a sufficient time to form said film of superconducting precursor metals.

2. A method according to claim 1 which includes the additional step of oxidizing said film of superconducting precursor metal at a sufficient annealing temperature to form a superconducting ceramic.

3. A method for making a superconducting ceramic according to claim 2 wherein said metal precursor ions are selected from the group of ions consisting of La, Y, Sm, Eu, Gd, Tb, Dy, Ho, Er, Tm Yb, Lu Th, Ba, Bi, Tl, Sr, Ca, Pb, Hg, Ag and Cu.

4. A method for making a superconducting ceramic according to claim 3 wherein said film of superconducting precursor metals consists of Ba, Ca, and Cu and wherein said oxidizing of said film is conducted in the presence of Tl to produce a superconducting ceramic film.

5. A method for making a superconducting ceramic according to claim 2 wherein said film of superconducting precursor metals is doped with Ag.

6. A method for making a superconducting ceramic according to claim 2 wherein said direct current voltage is between 4 to 6 volts and said alternating current frequency is between 15 to 19 KHz.

7. A method for making a superconducting ceramic according to claim 2 wherein said solution into which said counter and working electrodes are immersed comprises DMSO.

8. A method for making a superconducting ceramic according to claim 2 wherein said film of superconducting precursor metals consists of Bi, Sr, Ca, and Cu and wherein oxidizing of said film produces a superconducting ceramic.

9. A method for making a superconducting ceramic according to claim 2 wherein said film of superconducting precursor metals consists of Y, Ba and Cu and wherein oxidizing of said film produces a superconducting ceramic.

10. A method for making a superconducting ceramic according to claim 2 wherein said working electrode consists essentially of silver.

11. A method for making a superconducting ceramic precursor film according to claim 1 wherein said metal precursor ions are selected from the group of ions consisting of La, Y, Sm, Eu, Gd, Tb, Dy, Ho, Er, Tm Yb, Lu Th, Ba, Bi, Tl, Sr, Ca, Pb, Hg, Ag and Cu.

12. A method for making a film of superconducting precursor metals according to claim 11 wherein said film consists of Tl, Ba, Ca, and Cu.

13. A method for making a film of superconducting precursor metals according to claim 11 wherein said film consists of Bi, Sr, Ca and Cu.

14. A method for making a film of superconducting precursor metals according to claim 11 wherein said film consists of Y, Ba and Cu.

15. A method for making a superconducting ceramic precursor film according to claim 1 wherein said film of superconducting precursor metals is doped with Ag.

16. A method for making a superconducting ceramic precursor film according to claim 1 wherein said direct current voltage is between 4 to 6 volts and said alternating current frequency is between 15 to 19 KHz.

17. A method for making a superconducting ceramic precursor film according to claim 1 wherein said solution into which said counter and working electrodes are immersed comprises DMSO.

18. A method for making a superconducting ceramic precursor film according to claim 1 wherein said working electrode consists essentially of silver.

* * * * *